United States Patent [19]

Tanaka

[11] Patent Number: 5,412,710
[45] Date of Patent: May 2, 1995

[54] FACSIMILE MACHINE CAPABLE OF TRANSMITTING VOICE MESSAGES

[75] Inventor: Hidemasa Tanaka, Kawasaki, Japan

[73] Assignee: Fujitsu Limited, Kanagawa, Japan

[21] Appl. No.: 944,461

[22] Filed: Sep. 11, 1992

[30] Foreign Application Priority Data

Sep. 11, 1991 [JP] Japan .................. 3-231737

[51] Int. Cl.6 ........................................... H04M 3/42
[52] U.S. Cl. ..................................... 379/67; 379/88; 379/89; 379/100
[58] Field of Search ................ 379/67, 88, 89, 100

[56] References Cited

U.S. PATENT DOCUMENTS

| | | | |
|---|---|---|---|
| 5,014,296 | 5/1991 | Saigano | 379/67 |
| 5,091,931 | 2/1992 | Milewski | 379/100 |
| 5,127,047 | 6/1992 | Bell | 379/89 |
| 5,138,654 | 8/1992 | Yuki | 379/100 |
| 5,196,943 | 3/1993 | Hersee | 379/88 |
| 5,227,893 | 7/1993 | Ett | 358/400 |
| 5,282,242 | 1/1994 | Hachinoda | 379/100 |
| 5,289,532 | 2/1994 | Ishikawa | 379/100 |

FOREIGN PATENT DOCUMENTS

| | | |
|---|---|---|
| 136455 | 5/1989 | Japan . |
| 216664 | 8/1989 | Japan . |
| 63264 | 3/1990 | Japan . |

*Primary Examiner*—James L. Dwyer
*Assistant Examiner*—Michael N. Lau

[57] ABSTRACT

A facsimile machine includes a scanner for scanning documents and outputting image data corresponding to images on the documents, a destination controller for specifying a destination station to be called, a voice storage for storing a plurality of voice messages, a selecting controller for selecting one of the voice messages stored in the voice storage, a transmission unit for transmitting the image data output from the scanner and a voice message selected by the selecting controller to a called destination station specified by the destination controller, a receiving unit for receiving image data and a voice message transmitted from another facsimile machine, a printer for printing the image data received by the receiving unit on a recording paper, and a loudspeaker for outputting the voice message received by the receiving unit.

12 Claims, 16 Drawing Sheets

F I G. 3
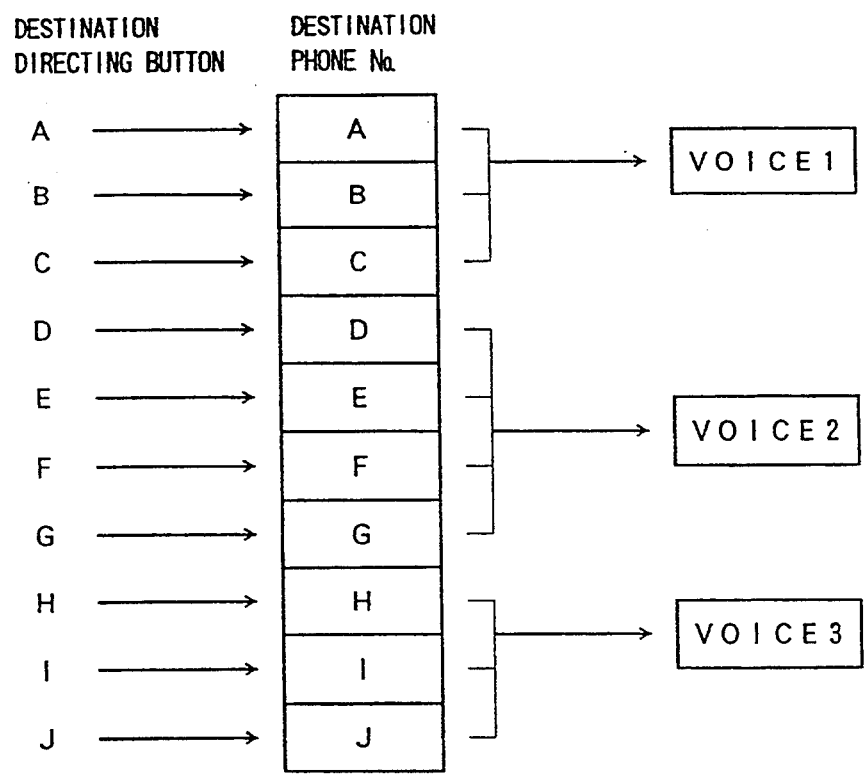

| 81-012-1111 VOICE 1 |

| 81-012-1111 VOICE 2 |

FIG. 8B  ⇧ '2'

FIG. 14
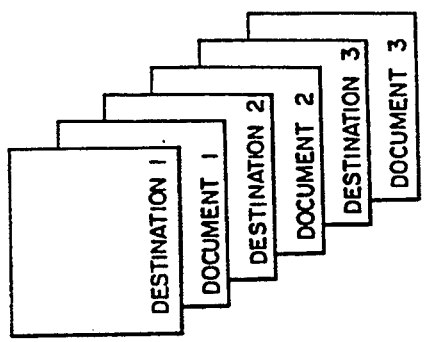
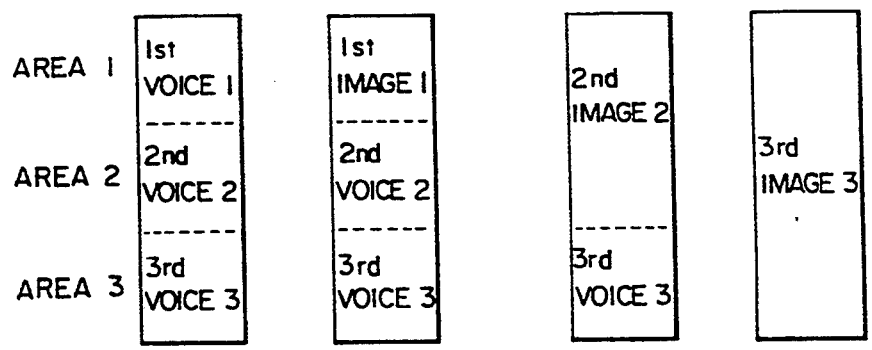
FIG. 15A  FIG. 15B  FIG. 15C  FIG. 15D

FACSIMILE MACHINE CAPABLE OF TRANSMITTING VOICE MESSAGES

BACKGROUND OF THE INVENTION (1) Field of the Invention

The present invention generally relates to a facsimile machine capable of transmitting voice messages, and more particularly to a facsimile machine in which a voice message matched with each destination station can be easily transmitted.

(2) Description of Related Art

Conventionally, facsimile machines each capable of transmitting voice messages along with image information have been proposed. This type of facsimile machine is disclosed, for example, in Japanese Laid Open Patent Application No. 1-136455, No. 1-216664, and No. 2-63264.

A conventional facsimile machine disclosed in each of the above references is provided with a voice memory storing voice data and an image memory storing image data. An operator inputs a voice message via a microphone to the facsimile machine, the input voice message is converted into voice data, and the voice data is stored in the voice memory. Image data obtained by optically scanning a document is stored in the image memory. Then, the facsimile machine calls a destination station, and the voice data read out from the voice memory is transmitted to the destination along with the image data read out from the image memory. In the called destination station, a voice message corresponding to the received voice data is output from a loudspeaker and a recording sheet on which an image corresponding to the received image data is output from a plotter.

In a case where a plurality of voice messages are transmitted to a plurality of corresponding destination stations, every time a voice message is transmitted to a destination station, an operation must be carried out for inputting a voice message matched with a destination station. Thus, the operation is complex for an operator of the facsimile machine.

SUMMARY OF THE INVENTION

Accordingly, a general object of the present invention is to provide a facsimile machine in which the disadvantages of the aforementioned prior art are eliminated.

A more specific object of the present invention is to provide a facsimile machine capable of transmitting voice messages each matching with a destination station, the transmission being executable without complex operations.

The above objects of the present invention are achieved by a facsimile machine which includes a scanner for scanning documents and outputting image data corresponding to images on the documents, a destination specifying unit for specifying a destination station to be called, and a voice storage for storing a plurality of voice messages. A selecting unit is connected to the storage for selecting one of the voice messages stored in the voice storage. A transmitter is coupled to the scanner, the destination specifying unit, voice storage and the selecting unit, for transmitting the image data output from the scanner and a voice message selected by the selecting unit to a called destination station specified by the destination specifying unit. A receiver is provided for receiving image data and a voice message transmitted from another facsimile machine. A printer is coupled to the receiver, for printing the image data received by the receiver on a recording paper. A voice output unit is coupled to the receiver for outputting the voice message received by the receiver.

According to the present invention, a voice message can be selected from a plurality of voice messages in accordance with a destination station to be called. Thus, a voice message suitable for a destination station can be transmitted to the destination station without complex operations.

Additional objects, features and advantages of the present invention will become apparent from the following detailed description with the accompanying drawings.

BRIEF DESCRIPTION OF THE DRAWINGS

FIG. 3 is a diagram illustrating relationships between destination directing buttons provided on the operation panel shown in FIG. 2 and voice messages;

FIG. 7 is a flow chart illustrating an operation for changing a voice message corresponding to a destination station to a new message;

FIGS. 8A and 8B (hereafter referred to collectively as FIG. 8) are a diagram illustrating information displayed on a display unit in the operation shown in FIG. 7;

FIG. 14 is a diagram illustrating destination papers each indicating a destination phone number and documents to be transmitted to corresponding destination stations;

FIGS. 15A, 15B, 15C, and 15D (hereafter referred to collectively as FIG. 15) are a diagram illustrating a buffer memory provided in the facsimile machine shown in FIG. 13.

DESCRIPTION OF THE PREFERRED EMBODIMENTS

A description will now be given of a first embodiment of the present invention with reference to FIGS. 1–6.

Figure 1:
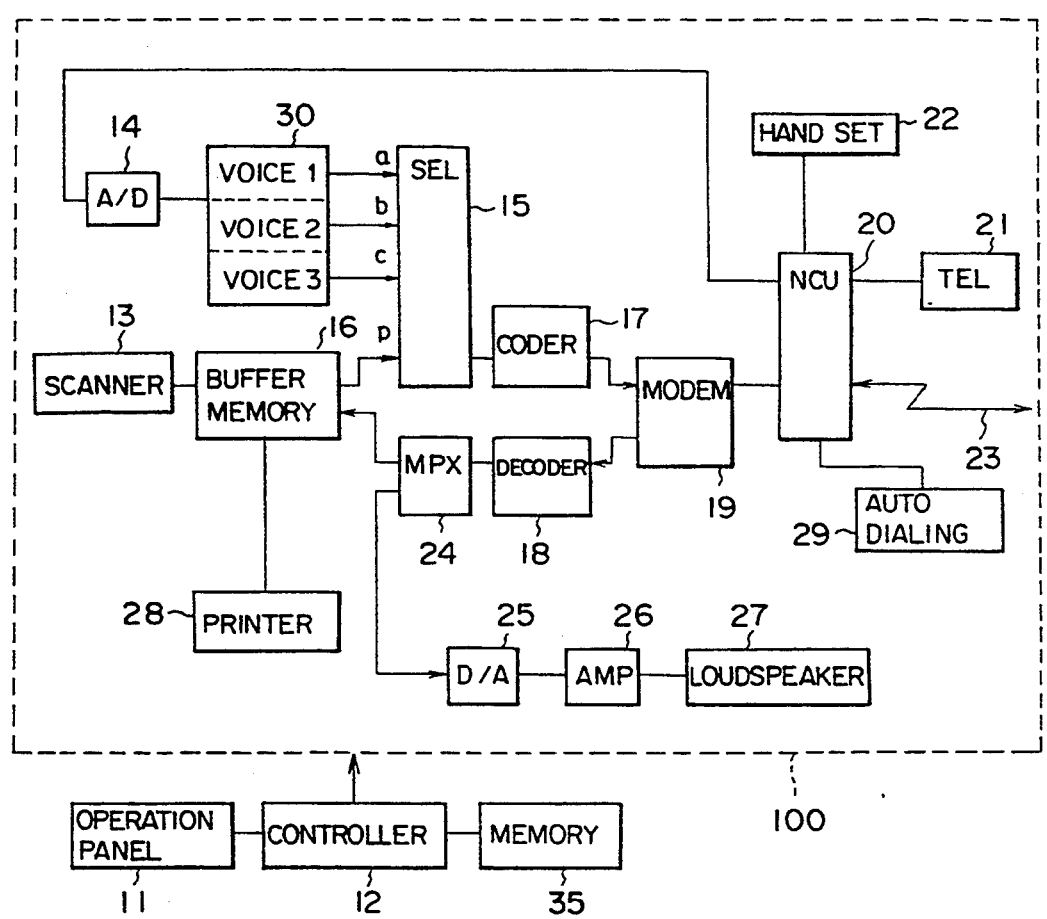
FIG. 1 is a block diagram illustrating a facsimile machine according to an embodiment of the present invention.

Referring to FIG. 1, which shows a facsimile machine according to the first embodiment, the facsimile machine has an operation panel 11, a controller 12 and a facsimile body 100. The controller 12 controls the facsimile body 100 in accordance with instructions supplied from the operation panel 11. The facsimile body 100 has a scanner 13, a buffer memory 16, a coder 17, a decoder 18, a modem 19, a network control unit (NCU) 20 and a printer 28. The scanner 13 optically reads documents and outputs image data. The image data output from the scanner is stored in the buffer memory 16. The image data read out from the buffer memory 16 is supplied to the coder 17 via a selector 15. The image data is compressed and coded by the coder 17 and transmitted via the modem 19 and the network control unit 20 to a public line 23 of telecommunication. When image data transmitted through the public line 23 is received in the network control unit 20, the received image data is supplied to the decoder 18 via the modem 19. The image data decoded by the decoder 18 is supplied to to a buffer memory 16 via the multiplexer 24 and is stored therein. The image data is supplied from the buffer memory 16 to the printer 28, so that the printer 28 prints images corresponding to the image data on recording sheets.

The facsimile body 100 has also a voice memory 30, an analog-to-digital converter 14, a telephone unit 21, a handset 22, a digital-to-analog converter 25, an amplifier 26, and a loudspeaker 27. Voice messages are input to the facsimile machine via the handset 22 or the telephone unit 21, and voice signals corresponding to the voice messages are supplied to the analog-to-digital converter 14 via the network control unit 20, they are then converted into voice data (digital data) by the analog-to-digital converter 14. The voice data output from the analog-to-digital converter 14 is stored in the voice memory 30. The voice data read out from the voice memory 30 is supplied to the coder 17 via the selector 15. The voice data is compressed and coded by the coder 17 in the same manner as the image data described above. Coded voice data is transmitted to the public line 23 via the modem 19 and the network control unit 20. When the network control unit 20 receives voice data, the received voice data is supplied to the decoder via the modem 19. The decoder 18 decodes the received voice data in the same manner as the image data described above. The voice data output from the decoder 18 is supplied to the digital-to-analog converter 25 via the multiplexer 24. The voice data is converted into voice signals (analog signals) by the digital-to-analog converter 25 and the voice signals are supplied to the loudspeaker 27 via the amplifier 26. Then the loudspeaker 27 is driven by the voice signals so that voice messages are output therefrom.

An autodialing controller 29 is connected to the network control unit 20 for automatically calling a destination station at a predetermined time.

Figure 2:
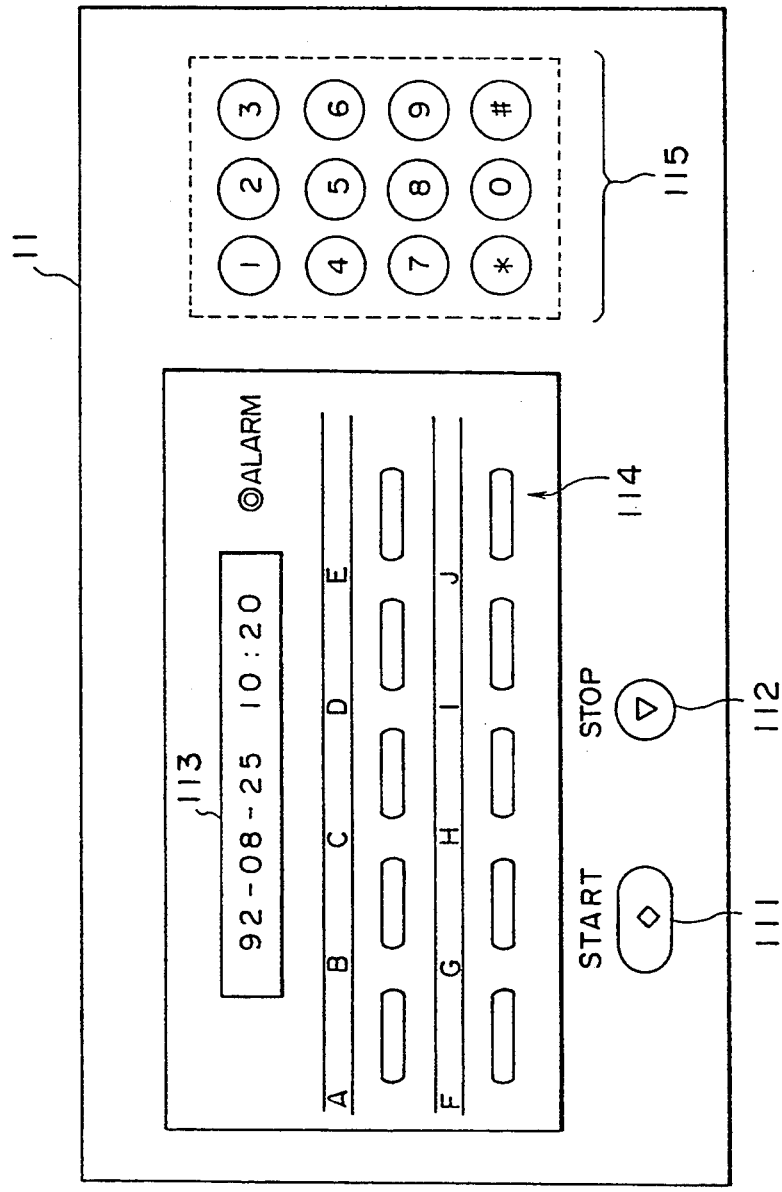
FIG. 2 is a diagram illustrating an operation panel provided in the facsimile machine shown in FIG. 1.

The operation panel 11 is constituted as shown in FIG. 2. Referring to FIG. 2, the operation panel 11 has a start button 111 used for starting a facsimile communication to a destination station, a stop button 112 used for interrupting a facsimile communication, a display unit 113 displaying a phone number of a called destination station and a voice message to be transmitted to the destination station, and so on. The operation panel 11 has also destination directing buttons 114 and number keys 115. Each of the destination directing buttons 114 (A through J) corresponds to a destination station. When each of the destination directing buttons 114 is operated, a phone number identifying the corresponding destination station is supplied from the operation panel 11 to the controller 12. The number keys 115 are operated to input a phone number identifying a destination station to which image data should be transmitted.

The voice memory 30 has three areas, the first area (VOICE 1), the second area (VOICE 2) and the third area (VOICE 3). Three kinds of voice data can be previously stored in the first (VOICE 1), second (VOICE 2) and third (VOICE 30) area of the voice memory 30. Each of the destination directing buttons 114 (A through J) corresponds to one of the three areas of the voice memory 30. A relationship between the areas of the voice memory 30 and the destination directing buttons 114 is stored, as a table, in a memory 35 connected to the controller 12. The relationship is shown, for example, in FIG. 3. Referring to FIG. 3, destination directing buttons A, B and C correspond to the first voice area (VOICE 1), destination directing buttons D, E, F and G correspond to the second voice area (VOICE 2), and destination directing buttons H, I and J correspond to the third voice area (VOICE 3). That is, destination stations A, B and C identified by phone numbers corresponding to the destination directing buttons A, B and C are assigned to the first voice area (VOICE 1), destination stations D, E, F and G identifying by phone numbers corresponding to the destination directing buttons D, E, F and G are assigned to the second voice area (VOICE 2), and destination stations H, I and J identified by phone numbers corresponding to the destination directing buttons H, I and J are assigned to the third voice area (VOICE 3).

Figure 4A:
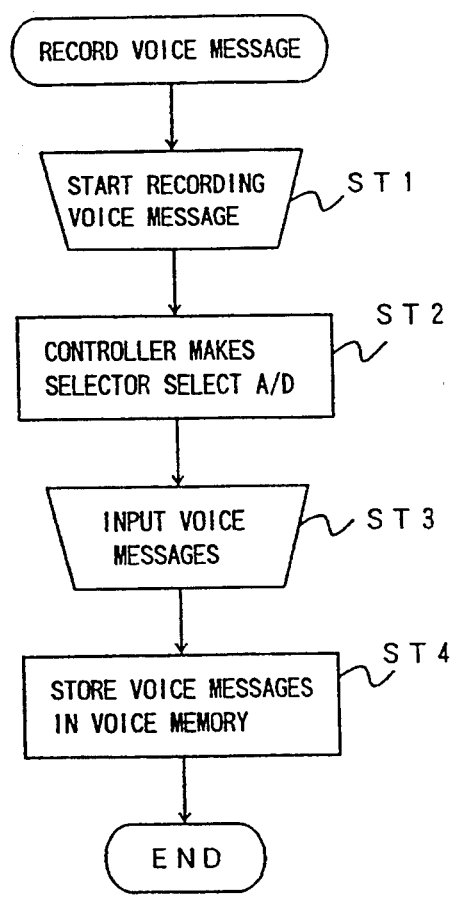
FIGS. 4A, 4B and 4C are flow charts illustrating processes in a transmission mode.
Figure 4B:
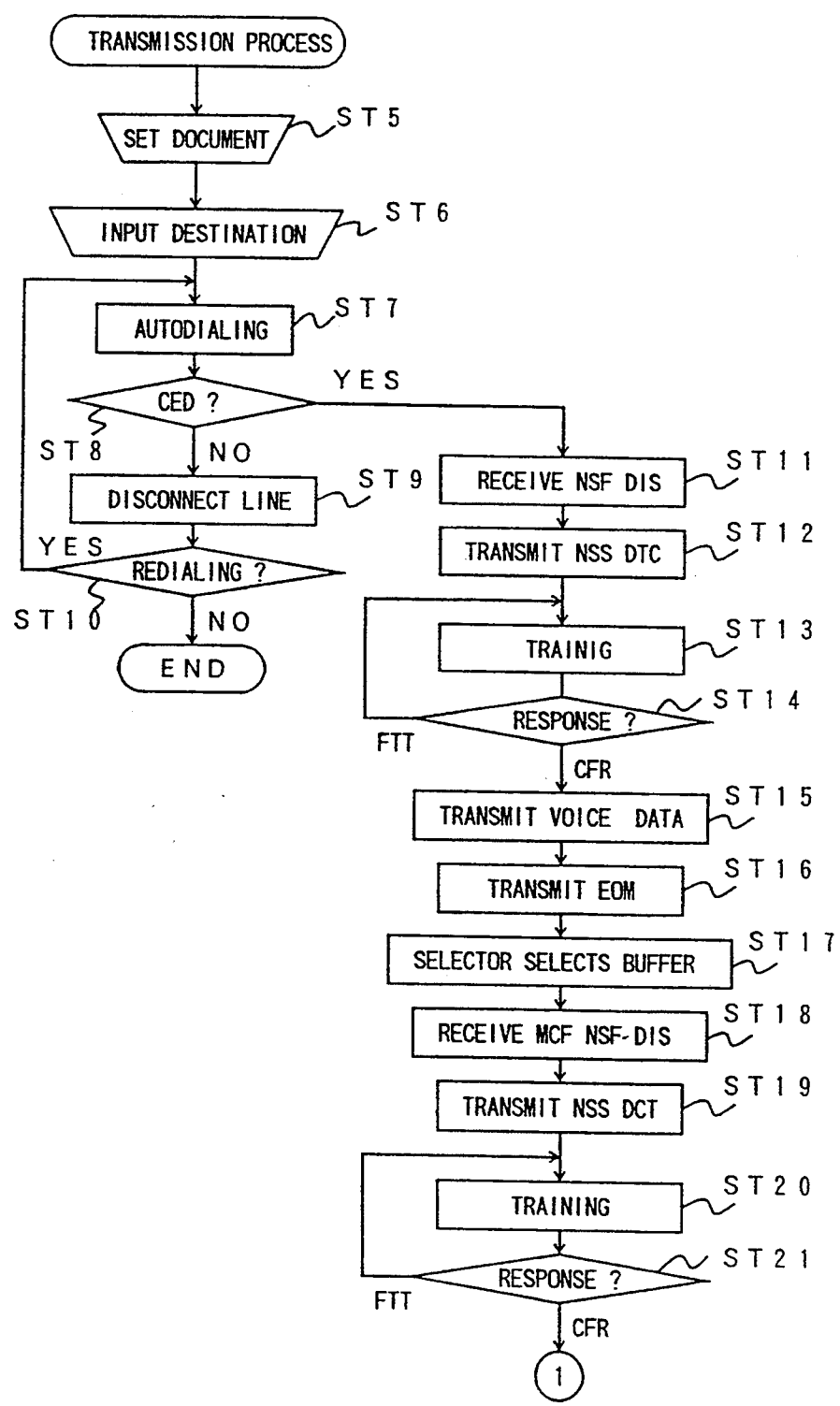
Figure 4C:
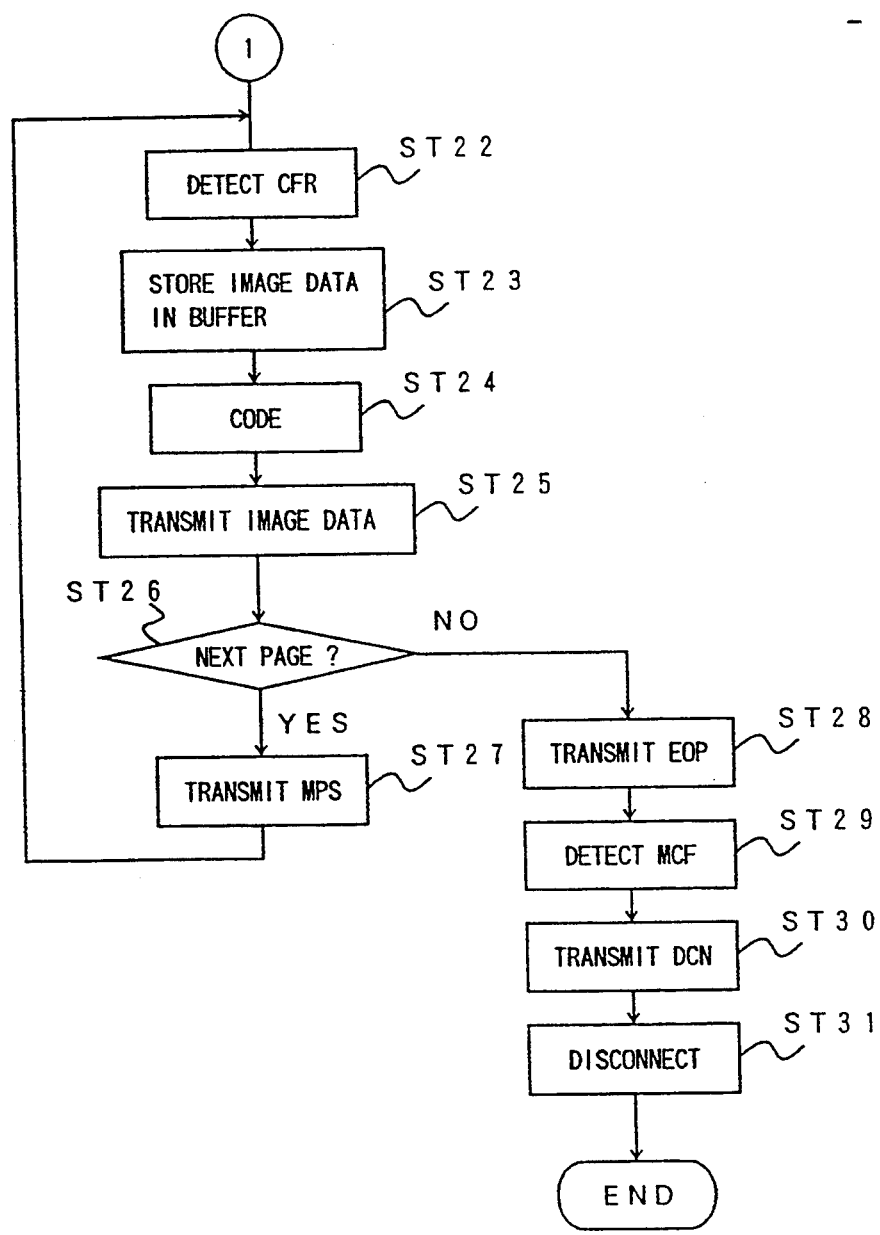

A transmission operation is carried out in accordance with flow charts shown in FIGS. 4A, 4B and 4C.

First, a process for recording voice messages is carried out in accordance with a flow chart shown in FIG. 4A. Referring to FIG. 4A, in step ST1, a start instruction of recording voice messages is supplied from the operation panel 11 to the controller 12. In step ST2, the controller 12 controls a selector provided in the network control unit 20 so that the analog-to-digital converter 14 is selected. In step ST3, an operator inputs voice massages to the handset 22 or the telephone unit 21. Then, in step ST4, voice signals corresponding to the input voice messages are converted into voice data by the analog-to-digital converter 14, and the voice data is stored in the voice memory 30. In this case, a first message, a second message and a third message are input to this facsimile machine, and first voice data, second voice data and third voice data respectively corresponding to the first, second and third voice messages are respectively stored in the first (VOICE 1), the second (VOICE 2) and the third (VOICE 3) areas of the voice memory 30.

Next, a process for transmitting image data and the voice data to a destination station is carried out in accordance with flow charts shown in FIGS. 4B and 4C.

A document is set in the scanner 13, the operator operates a destination directing button on the operation panel 11, and then the controller 12 instructs the autodialing controller 29 to call a destination station identified by a phone number corresponding to the destination directing button operated by the operator (ST5 and ST6). The autodialing controller 29 controls the network control unit 29 so that the destination station corresponding to the operated destination directing button is called (ST7). Then, it is determined whether or not a CED (Called Station Identification) signal is returned from the destination station (ST8). When it is determined that the CED is not returned in step ST8, the network control unit 20 disconnects the public line 23 (ST9) and it is then determined whether or not a redialing operation is required (ST10). When the redialing operation is required, the above steps ST7, ST8, ST9 and ST10 are repeated. When the redialing operation is not required, the process is completed.

When it is determined that the CED signal is returned from the destination station in step STS, an NSF DIS (Non-Standard Facilities Digital Identification Signal) is received, and an NSS DTC (Non-Standard Set-Up Digital Transmit Command) is transmitted to the destination station (ST11 and ST12). After that, a TCF (Training Check) signal is transmitted to the destination and a response to the TCF is awaited (ST13 and ST14). When an FTT (Failure to Train) is returned from the destination, the above steps ST13 and ST14 are repeated. When a CFR (Confirmation to Receive) signal is received in response to the TCF, the selector 15 selects the voice memory 30. Voice data is read out from the voice memory 20. Here, if a destination directing button A is operated, the first voice data stored in the first voice area (VOICE 1) is selected with reference to the table stored in the memory 35. As a result, the first voice data is read out from the voice memory 30 and supplied to the coder 17. The first voice data is compressed and coded by the coder 17 and supplied to the network control unit 20 via the modem 19. Then the coded voice data is transmitted from the network control unit 20 to the called destination station through the public line 23 (ST15). Then an EOM (End of Message) signal is transmitted to the called destination station (ST16), and the selector 15 is switched to the buffer memory 16 side (ST17).

After an MCF NSF DIS (Message Confirmation NSF DIS) is received in step ST18, the NSS DTC is transmitted in response to the MCF NSF DIS in step (ST19). Then, a training operation (ST20 and ST21) is carried out. When the CFR is received in response to the TCF in the training operation, the process proceeds to step ST22 shown in FIG. 4C.

After the CFR is received in step ST22, the scanner 13 is activated and the scanner 13 scans the document set therein. Then image data output from the scanner 13 is stored in the buffer memory 16 (ST23). The image data stored in the buffer memory 16 is read out and supplied to the coder 17 via the selector 15. The image data is compressed and coded by the coder 17 (ST24) and supplied to the network control unit 20 via the modem 19. The coded image data is transmitted to the called destination station through the public line 23 (ST25). After that, it is determined whether or not there is the next page to be scanned by the scanner 13 in step ST26. When there is the next page to be scanned by the scanner 13, a MPS (Multi-Page Signal) is transmitted (ST27) and the above steps ST22, ST23, ST24, ST25, ST26 and ST27 are repeated. When it is determined that there is no next page to be scanned by the scanner 13 in step ST26, the EOP is transmitted, and after the MCF is detected, a DCN (Disconnect) signal is transmitted (ST28, ST29 and ST30). After that, the network control unit 20 disconnects the public line 23 (ST31) and the process for transmitting the image data and the voice data is completed.

Figure 5A:
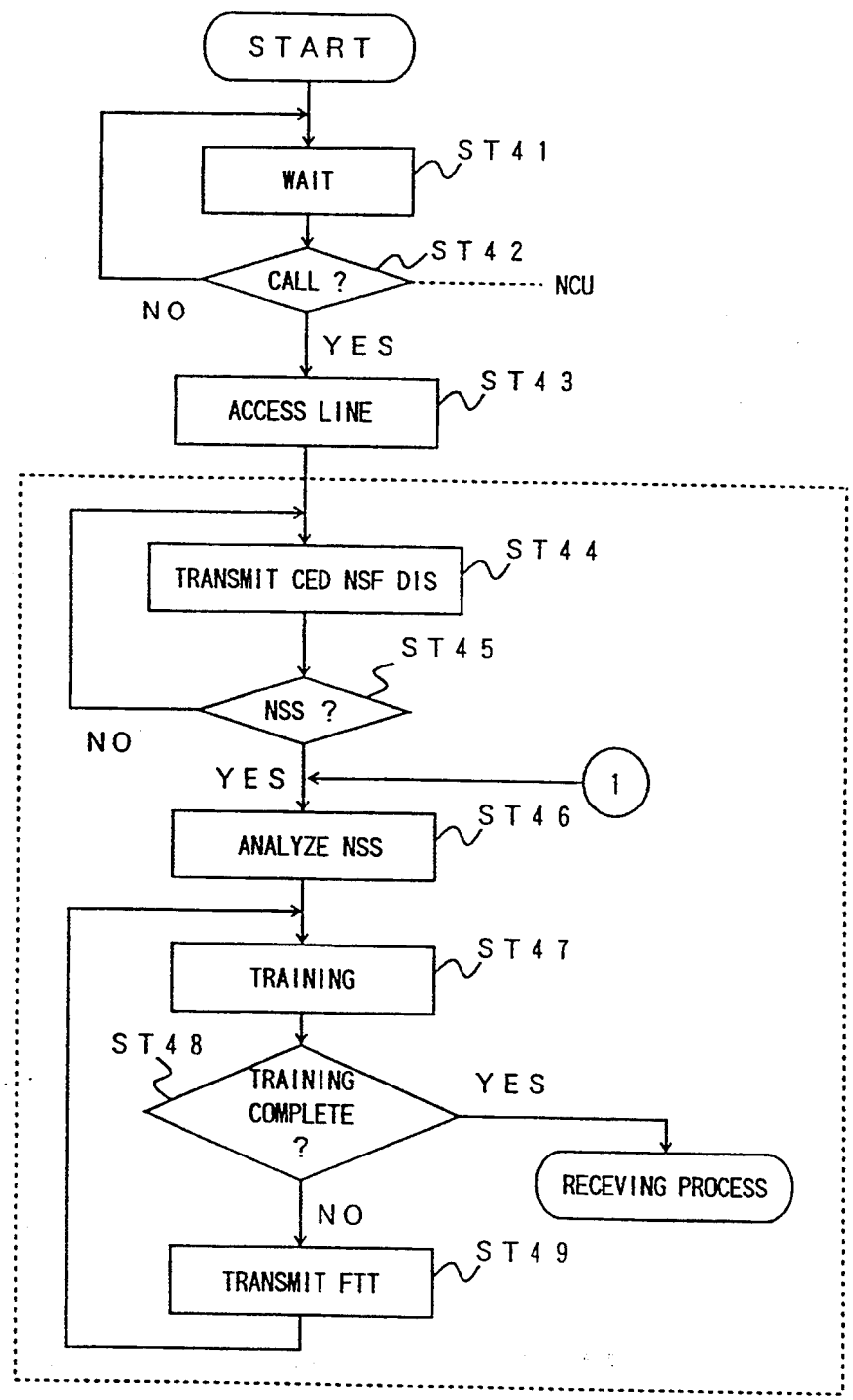
FIGS. 5A and 5B are flow charts illustrating processes in a receiving mode.
Figure 5B:
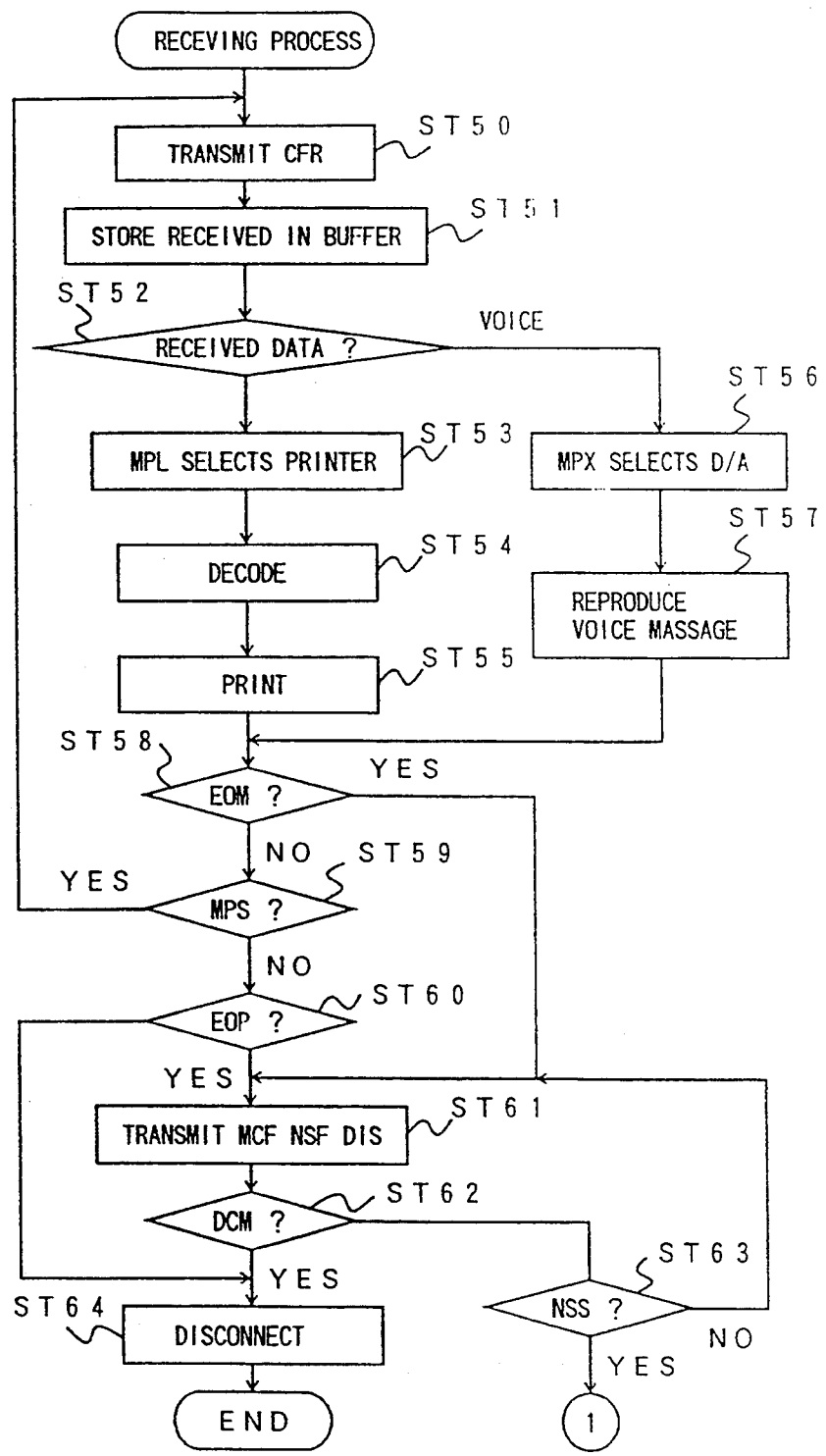
Figure 6:
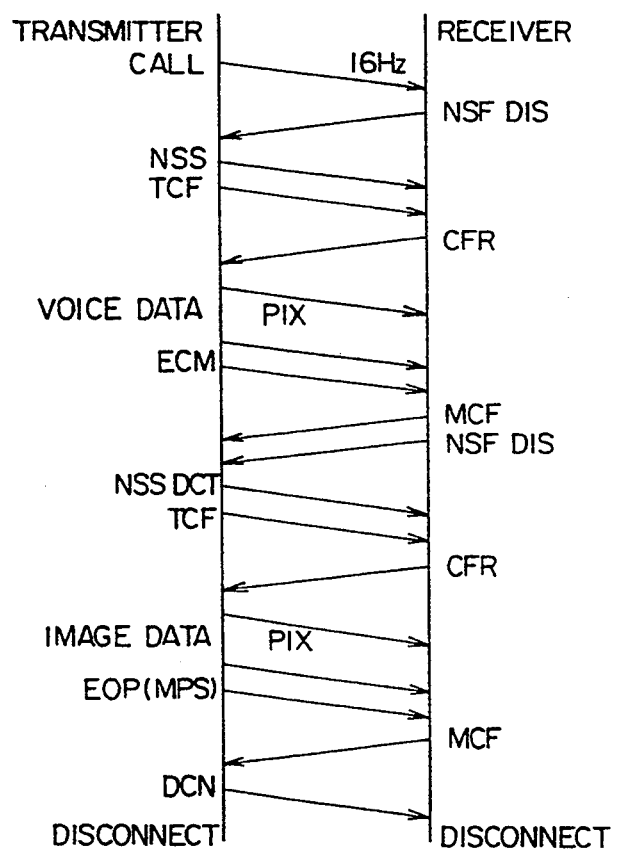
FIG. 6 is a diagram illustrating procedures performed between the facsimile machine (a transmitter) and a destination station (a receiver)

While the facsimile machine (the transmitter) is carrying out the above process, the destination station (the receiver) carries out a process in accordance with flow charts shown in FIGS. 5A and 5B.

Referring to FIG. 5A, the receiver is waiting to be called by the facsimile machine (ST41 and ST42). When the network control unit 20 detects a ringer signal (16 Hz) indicating to be called (ST42), the network control unit 20 accesses the public line 23 (ST43). After that, procedure signals such as CED NSF DIC are transmitted in accordance with procedures determined in the CCITT T-30 (ST44). The transmitter transmits the NSS in response to the procedure signals in step ST19, as described above. At this time, the transmitter writes information indicating that voice data is positioned at the first page of the transmitted data in a facsimile information field of the NSS. In the receiver, the NSS signal transmitted from the transmitter is analyzed in step ST46. That is, it is determined, based on the NSS signal, whether or not the voice data is positioned at the first page of the received data. After the step ST46, it is determined, based on the TCF transmitted from the transmitter, whether or not the public line 23 is in a state where a facsimile communication can be performed (ST47, ST48 and ST49), using signal FTT (Failure to Train). When it is determined that the public line 23 is in a state where the facsimile communication can be performed, the process proceeds to step ST50 shown in FIG. 5B.

Referring to FIG. 5B, the receiver transmits the CFR in response to the TCF from the transmitter in step ST50. Then, the network control unit 20 supplies received data to the decoder 18 via the modem 19. The received data is decoded by the decoder 18 and supplied to the buffer memory 16 via the multiplexer 24. That is, the received data is temporarily stored in the buffer memory 16 (ST51). When it is determined that the voice data is positioned at the first page of the received data based of the result of the analysis carried out in step ST46 (ST52), the multiplexer 24 selects the digital-to-analog converter 25 (ST56). As a result, the data which is the voice data (the first voice data in this case) is read out from the buffer memory 16 and converted into voice signals by the digital-to-analog converter 25. Then the voice signals are supplied to the loudspeaker 27 via the amplifier 26, so that a voice message corresponding to the voice data is output from the loudspeaker 27. In this case, the first voice message corresponding to the first voice data is output from the loudspeaker 27 (ST57). The first voice message is, for example, "PLEASE FORWARD THIS FACSIMILE LETTER TO MR. SUZUKI". In this case, persons around the receiver hear the first voice message, and recognize that a facsimile letter for Mr. Suzuki is being received now.

After the first voice message is output from the loudspeaker 27, the receiver transmits the MCF indicating that the message has been accurately received. After that, the image data transmitted after the voice data is processed in accordance with the steps ST50, ST51, ST52, ST53, ST54, ST55, ST58, ST59. As a result, the image data is temporarily stored in the buffer memory 16 and supplied from the buffer memory 16 to the printer 28. The printer 28 outputs papers, page by page, on each of which an image corresponding to the image data is printed. When the printing of the image data is completed, the process is carried out in accordance with procedures in steps ST60, ST61, ST62, ST63. Then, when the DCN signal is received, the network control unit 20 disconnects the public line 23 (ST64). That is, the process in the receiver is completed.

In the above example, as the destination directing button A is operated, the first voice data corresponding to the first voice message is transmitted from the facsimile machine to the destination station. When the destination directing button D or H is operated, either the second voice data corresponding to the second voice message or the third voice data corresponding to the third voice message is transmitted to the destination, in the same manner as the first voice data.

The procedures occurring between the transmitter and the receiver, described above, are collectively shown in FIG. 6.

A first modification of the first embodiment will be described below. In this modification, a voice message corresponding to a destination station as shown in FIG. 3 can be changed.

Figures 7, 8A:
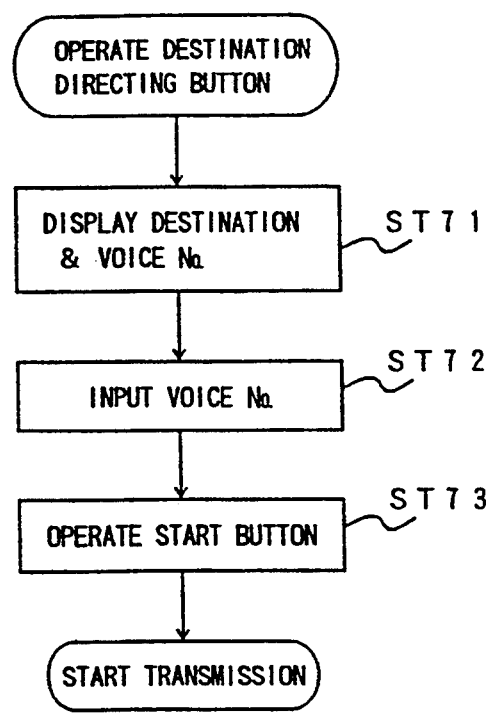

In this modification, a process shown in FIG. 7 is substituted for the step ST6 shown in FIG. 4B.

When, for example, the destination directing button A is operated, both the phone number corresponding to the destination directing button A and a voice number (VOICE 1) are displayed on the display unit 113 of the display panel 11 as shown in FIG. 8(A), in step ST71. When the operator operates, for example, a number key "2", the voice number is changed to the second voice data (VOICE 2). At this time, the display on display unit 113 changes as shown in FIG. 8(B). After that, when the start button 111 is operated, the transmission operation starts. That is, the second voice data (VOICE 2) substituted for the first voice data (VOICE 1) is transmitted to the destination station identified by the destination directing button A, and then the image data is also transmitted thereto. In the destination station, before the image data is received, the second voice message corresponding to the second voice data is output from the loudspeaker 27.

A second modification of the first embodiment will be described below. In this modification, a voice message to be transmitted is determined by manual operation.

Figures 9, 10A, 10B:
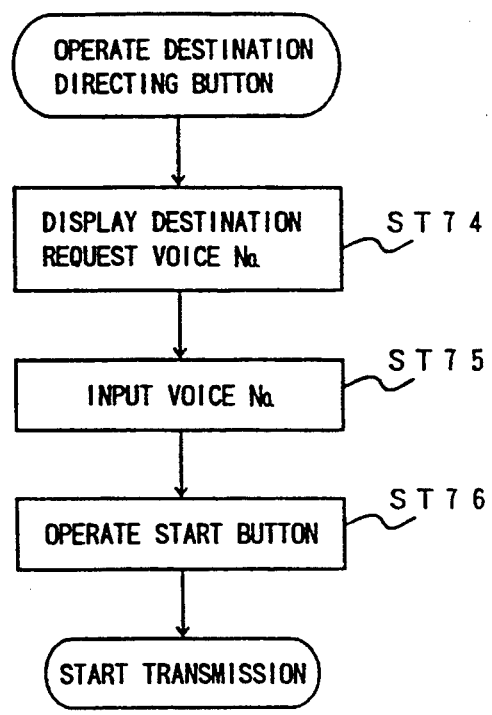
FIG. 9 is a flow chart illustrating an operation for identifying a voice message with respect to a destination station.
FIGS. 10A and 10B (hereafter referred to collectively as FIG. 10) are a diagram illustrating information displayed on the display unit in the operation shown in FIG. 9.

In this modification, the memory 35 for storing the table is not needed and a process shown in FIG. 9 is substituted for the step ST6 shown in FIG. 4B.

When, for example, the destination directing button A is operated, only the phone number corresponding to the destination directing button A is displayed on the display unit 113 of the operation panel 11 as shown in FIG. 10(A). Then, the display unit 113 displays information requesting to input a voice number in step ST74. When the operator operates, for example, a number key "2", the voice message number "2" (VOICE 2) is displayed on the display unit 113 as shown in FIG. 10(B) and the second voice message data (VOICE 2) is determined as voice data to be transmitted to the destination station, in step ST75. After that, when the start button 111 is operated, the transmission operation starts. That is, the second voice data (VOICE 2) is transmitted to the destination station identified by the destination directing button A, and then the image data is also transmitted thereto. In the destination station, before the image data is received, the second voice message corresponding to the second voice data is output from the loudspeaker 27.

A third modification of the first embodiment will described below. In this modification, two voice messages are transmitted to the destination station.

Figure 11:
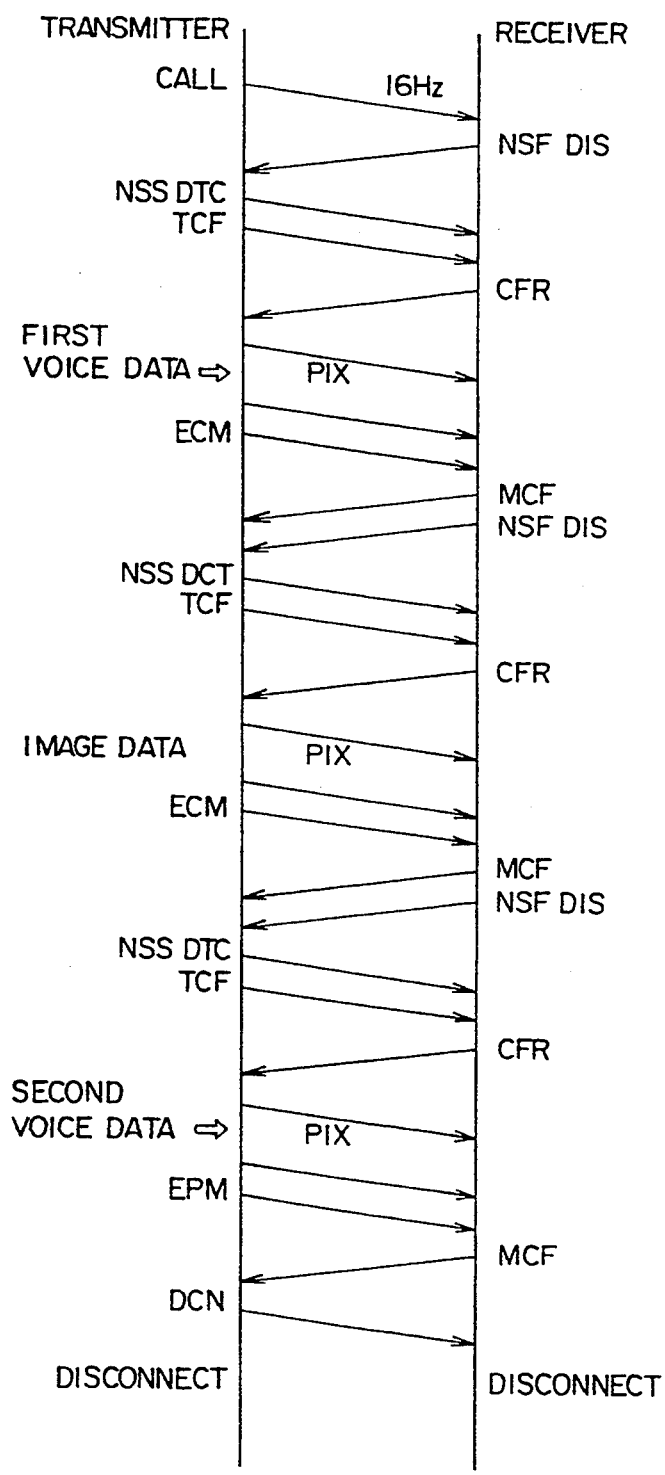
FIG. 11 is a diagram illustrating procedures performed by the facsimile machine (the transmitter) and the destination station (the receiver)
Figure 12:
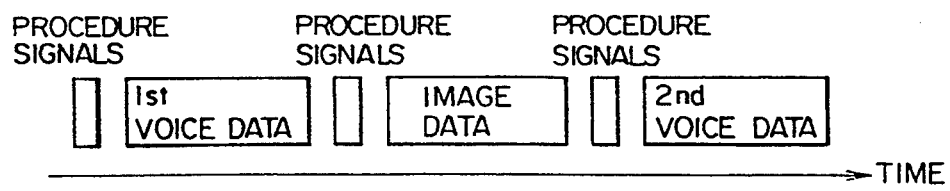
FIG. 12 is a diagram illustrating the order in which voice data, image data and procedure signals are transmitted.

After the network control unit 20 calls the destination station identified by the phone number input from the operation panel 11 by the operator, the first voice data is transmitted to the destination station. After this, the scanner 13 is driven and the image data is stored in the buffer memory 16. The image data is read out from the buffer memory 16 and transmitted to the destination station. Then, the second voice data is read out from the second area of the voice memory 30 and transmitted to the destination station. In this modification, the first and second voice data respectively are transmitted to the destination station before and after the image data, as shown in FIG. 12. The procedures between the transmitter and the receiver in the third modification are collectively shown in FIG. 11.

Figure 13:
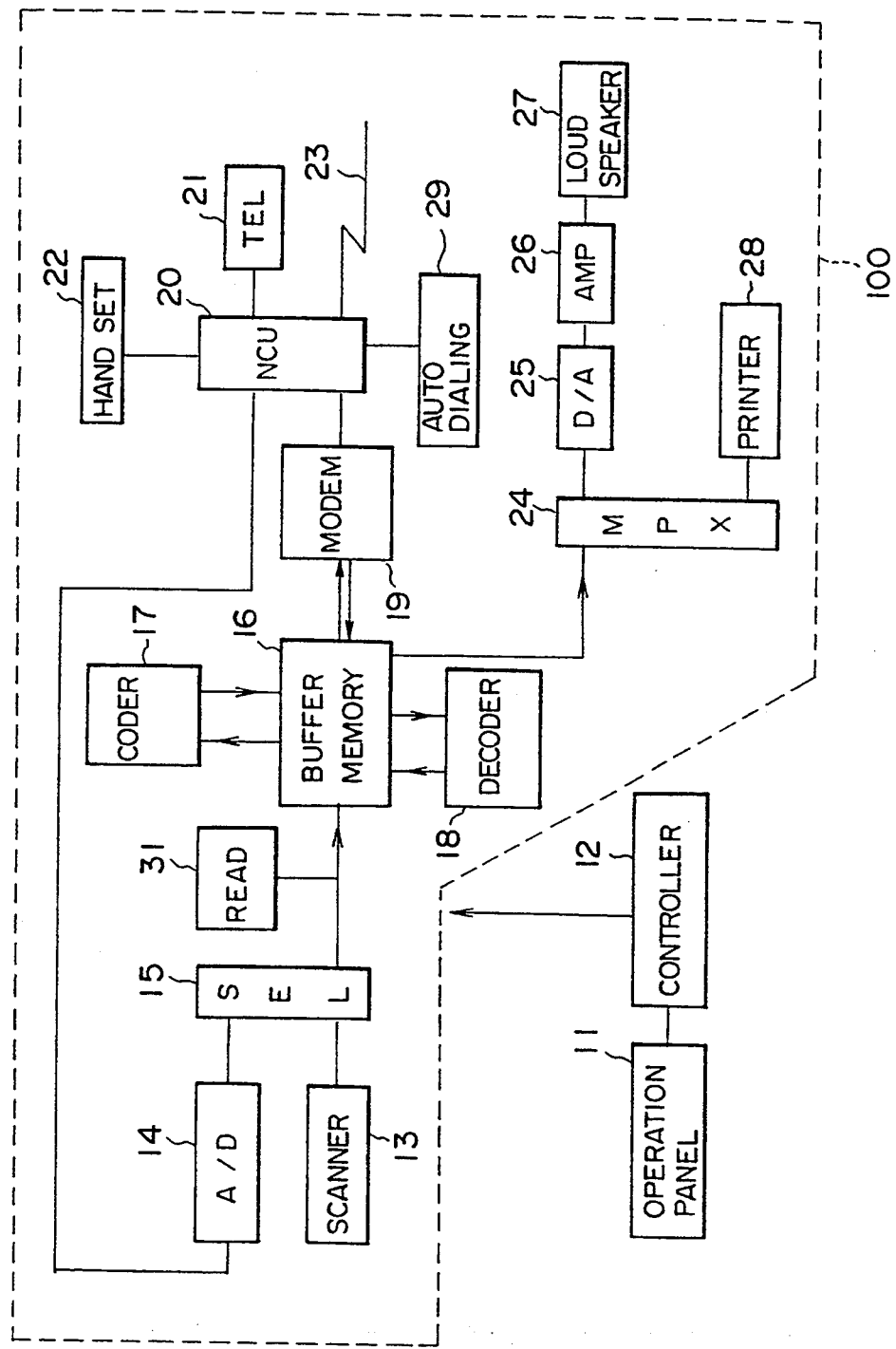
FIG. 13 is a block diagram illustrating a facsimile machine according to another embodiment of the present invention.

A description will now be given of a second embodiment of the present invention with reference to FIG. 13, 14 and 15. In FIG. 13, those parts which are the same as those shown in FIG. 1 are given the same reference numbers.

The facsimile body 100 has the buffer memory 16. Both the voice data and the image data are stored in the buffer memory 16. That is, the voice memory 30 shown in FIG. 1 is not provided in the facsimile body 100 in the second embodiment.

The operator inputs the first, second and third voice messages into the facsimile machine via the handset 22 or the telephone set 21. The first, second and third voice data are respectively stored in the first, second and third areas of the buffer memory 16, as shown in FIG. 15(a). After that, three destination sheets (1), (2) and (3) and three documents (1), (2) and (3) alternately stacked as shown in FIG. 14 are set in the scanner 13. A phone number identifying a destination station and a voice message number identifying a voice message are marked on each of the destination sheets (1), (2) and (3).

When the start button 111 is operated by the operator, first, the first destination sheet (1) is scanned by the scanner 13 and the phone number and the voice message number are detected from data output from the scanner 13 by the destination read circuit 31. Then the network control unit 20 calls a destination station identified by the phone number detected by the destination read circuit 31 based on an instruction from the autodialing controller 29. When the network control unit 20 is connected to the destination station via the public line 23, the first voice data identified by the voice message number detected by the destination read circuit 31 is read out from the first area of the buffer memory 16 and transmitted to the called destination station from the network control unit 20. After this, the first document (1) is scanned by the scanner 13. As the first voice data has been transmitted to the called destination station, first image data output from the scanner 13 is stored in the first area of the buffer memory 16, as shown in FIG. 15(b). The first image data is read out from the first area of the buffer memory 16 and transmitted to the called destination station to which the first voice data has been transmitted.

The scanner 13 repeats scanning operations. When the scanner 13 scans the second destination sheet (2), a phone number and a voice message number marked on the second destination sheet (2) are detected by the destination read circuit 31. A destination station identified by the phone number marked on the second destination sheet (2) is called, and the second voice data identified by the voice message number is read out from the second area of the buffer memory 16. Then the second voice data is transmitted to the called destination station. After this, the second document (2) is scanned by the scanner 13 and second image data output from the scanner 13 is stored in the buffer memory 16. At this time, as the first image data and the second voice data have been read out from the buffer memory, the second image data output from the scanner 13 can be stored in the first and second areas of the buffer memory 16, as shown in FIG. 15 (c). The second image data is read out from the buffer memory 16 and transmitted to the called destination station to which the second voice data has been transmitted.

After the second image data is transmitted to the called destination, the third destination sheet (3) is scanned by the scanner 13. A destination station identified by a phone number marked on the third destination sheet (3) is called. Then third voice data identified by the voice message number marked on the third destination sheet (3) is read out from the third area of the buffer memory 16. The third voice data read out from the buffer memory 16 is transmitted to the called destination station. After this, the third document (3) is scanned by the scanner 13 and third image data output from the scanner 13 is stored in the buffer memory 16. At this time, as the second image data and the third voice data have been read out from the buffer memory 16, the third image data output from the scanner can be stored in the first, second and third areas of the buffer memory 16, as shown in FIG. 15(d). The third image data is read out from the buffer memory 16 and transmitted to the called destination station to which the third voice data has been transmitted.

According to the second embodiment, a large number of voice data and image data can be transmitted to a plurality of destination stations by using only one buffer memory 16.

Figure 16:
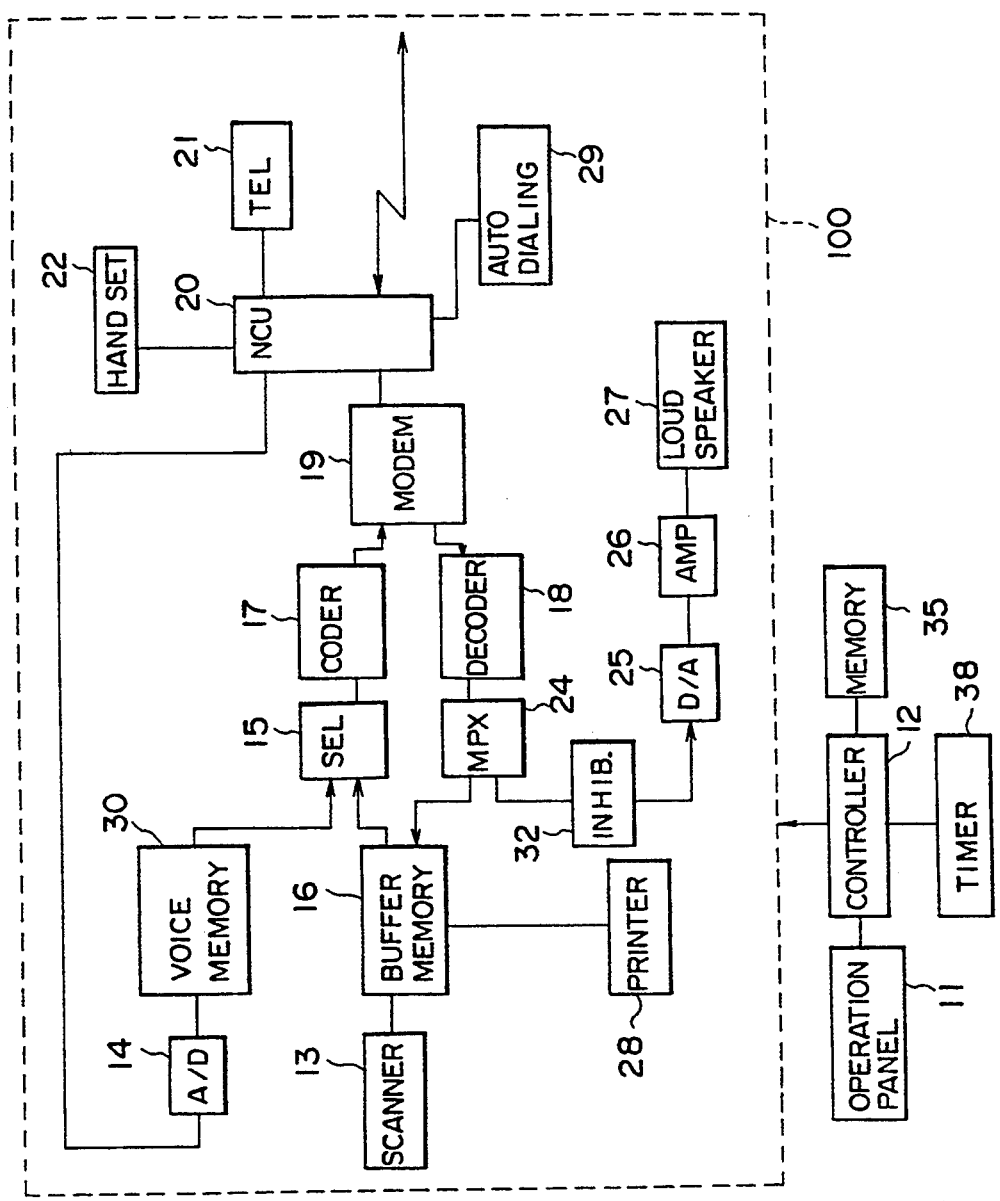
FIG. 16 is a block diagram illustrating a facsimile machine according to yet another embodiment of the present invention.

A description will now be given of a third embodiment of the present invention with reference to FIG. 16. In FIG. 16, those parts which are the same as those shown in FIG. 1 are given the same reference numbers.

In the third embodiment, the voice message is inhibited from outputting from the loudspeaker 27 for a predetermined time. Referring to FIG. 16, the facsimile machine is provided with a timer 38. A starting time and an end time are set in the timer. The timer 38 outputs an inhibit signal activated from the starting time to the end time. The controller 12 activates an inhibit circuit 32 while the inhibit signal output from the timer 38 is being activated. The inhibit circuit 32 interrupts voice data so that no voice signal is applied to the loudspeaker 27. Thus, the voice message is inhibited from outputting from the loudspeaker 27 from the starting time to the end time, which times are preset in the timer 38.

The starting time is determined to be, for example, at 9:00 pm, and the end time is determined to be, for example, at 8:00 am.

According to the third embodiment, voice messages are inhibited from being output from the loudspeaker during the night.

The present invention is not limited to the aforementioned embodiments, and variations and modifications may be made without departing from the scope of the claimed invention.

What is claimed is:

1. A facsimile machine comprising:
    scanner means for scanning documents and outputting image data corresponding to images on the documents;
    destination specifying means for specifying a destination station to be called;
    voice storage means for storing a plurality of voice messages;
    selecting means connected to said voice storage means for selecting a voice message from said plurality of the voice messages stored in the voice storage means;
    transmission means, coupled to said scanner means, said destination specifying means, said voice storage means and said selecting means, for transmitting said image data output from said scanner means and said voice message selected by said selecting means, to a called destination station specified by said destination specifying means;
    receiving means for receiving image data and a voice message transmitted from another facsimile machine;
    printing means, coupled to said receiving means, for printing the image data received by said receiving means on a recording paper; and
    voice output means, coupled to said receiving means, for outputting the voice message received by said receiving means.

2. A facsimile machine as claimed in claim 1, wherein said selecting means has a table indicating relationships between destination stations and voice messages, said selecting means selecting a voice message corresponding to the destination station specified by said destination specifying means with reference to said table.

3. A facsimile machine as claimed in claim 2, wherein said selecting means has revising means for changing a voice message which has been selected with reference to said table to another voice message stored in said voice storage means.

4. A facsimile machine as claimed in claim 1, wherein said selecting means has input means for inputting selecting information indicating a voice message to be selected, said selecting means selecting a voice message indicated by said selecting information.

5. A facsimile machine as claimed in claim 1, wherein said transmission means is constructed to transmit the selected voice message before the image data.

6. A facsimile machine as claimed in claim 1, wherein said transmission means is constructed to transmit the selected voice message in the same procedures as the image data.

7. A facsimile machine as claimed in claim 1, further comprising:
    detecting means, coupled to said scanner means, for detecting information identifying a voice message from data which is obtained when a sheet on which the information is formed is scanned by said scanner,
    wherein said selecting means selects a voice message identifying the information detected by said detecting means.

8. A facsimile machine as claimed in claim 5, wherein said voice storage means is constructed for storing image data output by said scanner means after the voice message which has been stored in said voice storage means is transmitted by said transmission means, and wherein the image data stored in said voice storage means is transmitted to the called destination station by said transmission means.

9. A facsimile machine as claimed in claim 1, wherein said transmission means has buffer storage means for temporarily storing image data output from said scanner means, said transmission means transmitting the image data stored in said buffer storage means.

10. A facsimile machine as claimed in claim 1, further comprising:

inhibit means, coupled to said voice output means, for inhibiting, for a predetermined time, said voice output means from outputting said voice message received by said receiving means.

11. A facsimile means as claimed in claim 10, wherein said inhibit means has timer means measuring a time during which said voice output means is inhibited from outputting said voice message.

12. A facsimile means as claimed in claim 1, further comprising:

voice input means, coupled to said voice storage means, for inputting voice messages by an operator, the voice messages input by said voice input means being stored in said voice storage means.

* * * * *